United States Patent [19]
Serafin et al.

[11] Patent Number: 6,077,616
[45] Date of Patent: *Jun. 20, 2000

[54] LAMINATED STRIP FOR USE AS REFLECTIVE VEHICLE TRIM

[75] Inventors: Daniel L. Serafin, Wexford; Frank A. Mozelewski, Lower Burrell; Robert E. Bombalski, New Kensington; Jean Ann Skiles, Gibsonia; Edward C. Robinson, New Kensington, all of Pa.; Peter M. Emens, Southfield, Mich.

[73] Assignee: Aluminum Company of America, Pittsburgh, Pa.

[*] Notice: This patent is subject to a terminal disclaimer.

[21] Appl. No.: 09/193,823

[22] Filed: Nov. 18, 1998

Related U.S. Application Data

[63] Continuation-in-part of application No. 08/798,536, Feb. 10, 1997, Pat. No. 5,865,931.

[51] Int. Cl.$^7$ ..................................................... B21D 39/00
[52] U.S. Cl. ............................ 428/622; 428/31; 428/623; 428/626; 428/632; 156/245
[58] Field of Search ............................... 428/31, 622, 626, 428/623, 632; 148/265; 156/269, 325

[56] References Cited

U.S. PATENT DOCUMENTS 4,101,698  7/1978  Dunning et al. .
5,448,404  9/1995  Schrenk et al. .

*Primary Examiner*—Deborah Jones
*Assistant Examiner*—Wendy Boss
*Attorney, Agent, or Firm*—Glenn E. Klepac

[57] ABSTRACT

A reflective laminated strip includes an aluminum alloy or steel strip having a cleaned and conversion coated outer surface, an adhesive layer adjacent the conversion coated outer surface, and a polymer layer joined to the adhesive layer. An exterior side of the polymer layer is coated with a reflective metal layer that is preferably stainless steel, chromium, nickel or aluminum having a thickness of less than about 5000 Å. In a preferred embodiment, an interior side of the polymer layer is coated with an adhesion-promoting metal layer or metal oxide layer having a thickness of about 50–5000 Å.

19 Claims, 1 Drawing Sheet

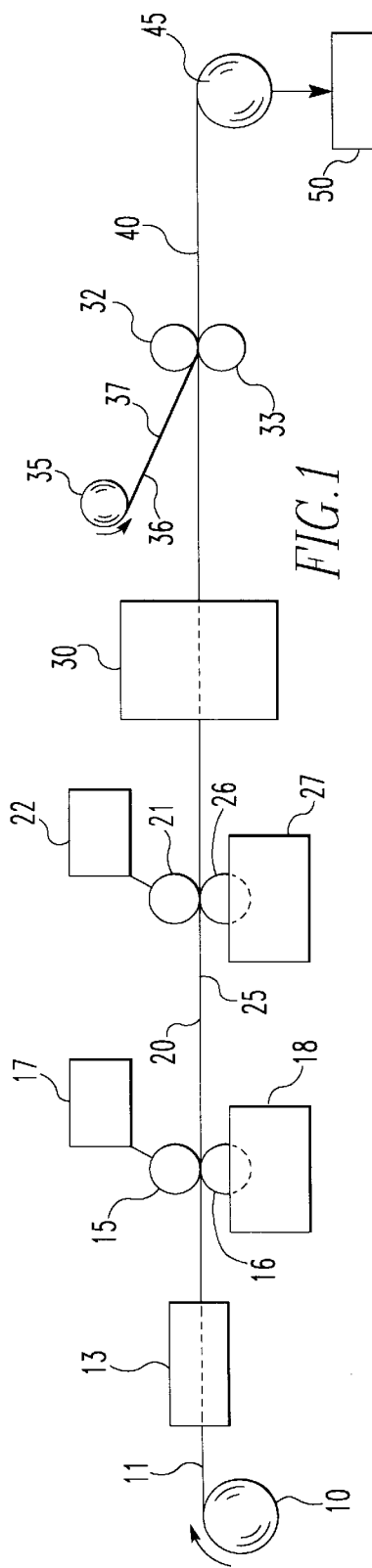
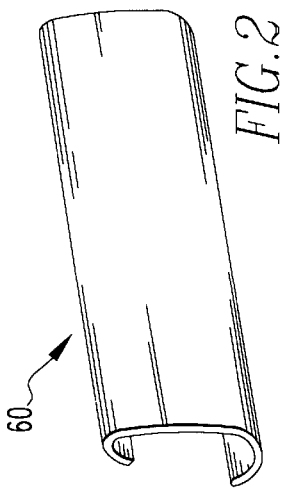
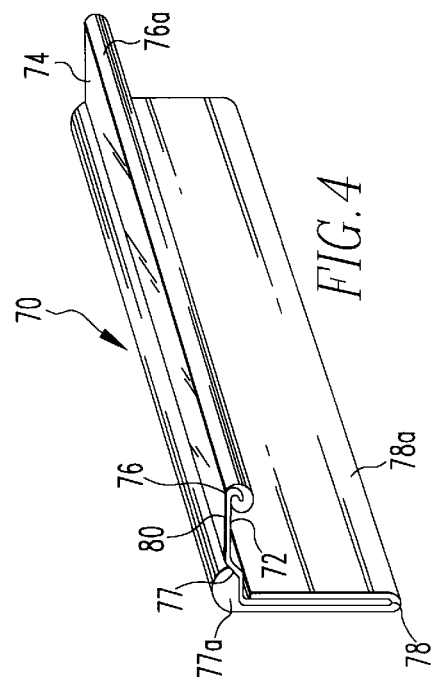
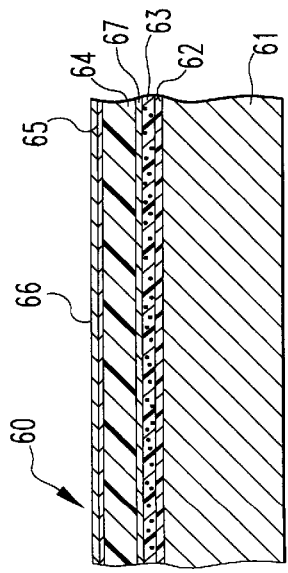

LAMINATED STRIP FOR USE AS REFLECTIVE VEHICLE TRIM

PENDING RELATED APPLICATION

This application is a continuation-in-part of U.S. Ser. No. 08/798,536, filed Feb. 10, 1997 for "Reflective Vehicle Trim" now U.S. Pat. No. 5,865,931.

FIELD OF THE INVENTION

The present invention relates to brightened laminated trim suitable for use on automobiles, trucks, boats and other vehicles and to a process for making such laminated trim.

BACKGROUND OF THE INVENTION

Shaped strips of stainless steel, stainless steel clad over aluminum, and various polymers combined with reflective metal layers are widely used as decorative trim on automobiles, trucks, boats and other vehicles. This decorative trim must be resistant to chemical attack and must have sufficient mechanical strength to resist denting after it is installed. Prior art steel and polymer based trim materials generally perform adequately but they are expensive. Accordingly, there still remains a need to provide an aluminum alloy based vehicle trim that is less expensive than steel and polymer based trim of the prior art.

The vehicle trim of our invention must be sufficiently reflective that it has substantially mirror-like characteristics, even after it is shaped in a roll-forming die or in a press. The term "substantially mirror-like" means that the trim surface has a distinctness of image ("D/I") of at least 80%. The D/I is the sharpness of a reflected image, as measured by the ratio of reflectance at 0.3° from specular to the reflectance at the specular angle. That is, $$D/I = \left(\frac{R_s - R_{0.3}}{R_s}\right) \times 100\%$$

where D/I=0 for a perfect diffuser and D/I=100% for a perfect mirror. The total reflectance of a surface is irrelevant in a consideration of its D/I.

As used herein, the term "strip" refers to a relatively narrow and thin sheet of an aluminum alloy. The width is about 1–100 cm, preferably about 2–40 cm, and the thickness is about 0.3–3.2 mm, preferably about 0.4–2.5 mm.

Numerous attempts have been made in the prior art to provide reflective metal finishes on the outer surfaces of laminated articles of various shapes for use as vehicle trim. Some prior art patents describing laminated articles having reflective surfaces are Dunning U.S. Pat. No. 4,101,698; Madonia U.S. Pat. No. 4,296,155; Nussbaum U.S. Pat. Nos. 4,349,592 and 4,368,225; Yamamoto U.S. Pat. No. 4,666,762; Yaver U.S. Pat. No. 4,877,657 and Suzuki U.S. Pat. No. 5,164,245. However, there is still a need for vehicle trim strips having a highly reflective surface, light weight and low cost.

SUMMARY OF THE INVENTION

In accordance with the present invention, there is provided a process for making a reflective laminated strip.

An aluminum alloy or steel sheet is cleaned to remove surface contaminants from at least one outer surface. The sheet has a thickness in the range of about 0.3–3.2 mm, preferably about 0.4–2.5 mm. A particularly preferred aluminum alloy sheet has a thickness of about 0.8 mm ($\frac{1}{32}$in).

The sheet is preferably an aluminum alloy sheet containing about 90 wt. % or more aluminum together with one or more alloying elements. The preferred alloying elements are manganese, comprising about 0.25 to 1.5 wt. % of the alloy; magnesium, comprising about 0.5 to 10 wt. % of the alloy; magnesium and silicon, each comprising about 0.5 to 2 wt. % of the alloy; and zinc, comprising about 0.8 to 8 wt. % of the alloy. Various aluminum alloys in sheet form are suitable for practice of the present invention including alloys of the 3000, 5000, 6000 and 7000 series (Aluminum Association designations). Some appropriate tempers are the H1X, H2X, H3X and O tempers (Aluminum Association designations).

Aluminum alloys of the AA5000 series are preferred, especially the AA5000 series alloys containing about 5 wt. % or less magnesium. Some suitable compositions include the 3003 and 3004 aluminum-manganese alloys; the 5182, 5052, 5657 and 5252 aluminum-magnesium alloys; the 6306 aluminum-magnesium-silicon alloy and the 7029 aluminum-zinc alloy (Aluminum Association series). A particularly preferred AA5182 alloy sheet is provided with an H2X temper.

The aluminum alloy sheet is uncoiled and cleaned in an aqueous alkaline cleaning solution to remove organic surface contaminants. Alternatively, the sheet may be cleaned in an acidic cleaning solution.

A conversion coating is next applied to the sheet in order to confer good adhesion to a polymeric adhesive layer and for improved corrosion resistance in the final product. Both chrome-containing and chrome-free systems are suitable. The chrome conversion coating generally contains a chromate and a phosphate. Some known non-chromate conversion coatings are solutions containing zirconate, titanate, molybdate, tungstate, vanadate and silicate ions, generally in combination with hydrogen fluoride or other fluorine compounds.

One suitable chrome-free conversion coating is the Betz Dearborn 1903 dry-in-place system. A suitable chrome-containing conversion coating is the Betz Dearborn 1904 system. These coatings are preferably applied by roll-coating to both sides of the sheet.

A polymeric adhesive layer is applied to the cleaned and conversion coated sheet surface. The adhesive is preferably a thermoplastic polymer such as Morton M805 polypropylene. Alternatively, the adhesive may be an epoxy-containing adhesive such as Morton 503A together with co-reactant F. Other useful adhesives contain thermoplastic polymers such as polyethylene terephthalate (PET) and various other polyolefins including polybutyldiene. The adhesive layer has a thickness of about 5–50 microns (0.2–2 mils). A particularly preferred adhesive layer has a thickness of about 0.4 mil (10 microns). Optionally, a thinner layer of an inexpensive coating may also be applied to a back side of the aluminum sheet. The back side coating may be a PPG 1BHC5428 epoxy or Valspar epoxy EUW0033, each with a thickness of approximately 0.1 to 0.3 mils (3–8 microns).

The adhesive layer is joined to a polymer sheet having an interior side adjacent the adhesive layer and an exterior side coated With a reflective metal layer. The polymer sheet is preferably a polyester such as polyethylene terephthalate (PET) or polybutylene terephthalate (PBT), and may also be a polyimide, a polyolefin such as polypropylene, or polyvinyl chloride. The polymer sheet must be resistant to outgassing when it is placed in a vacuum sputtering chamber. The polyester sheet may have a thickness of about 10–250 microns, preferably about 25–200 microns. A particularly preferred polyester sheet has a thickness of about 1 mil (25 microns).

In a preferred embodiment, an interior side of the polyester sheet is vacuum sputtered with an adhesion-promoting layer of a metal or metal oxide. The adhesion-promoting layer has a thickness of about 50–5000 Å. Some suitable metals include chromium, stainless steel, nickel, aluminum, and combinations thereof. Some suitable metal oxides are silicon oxide, titanium oxide, and aluminum oxide. Combinations of stainless steel and chromium having a total thickness of about 100–1000 Å are preferred.

An exterior side of the polyester sheet is vacuum sputtered with a reflective metal layer having a thickness of less than about 5000 Å. The metal layer may be chromium, stainless steel, nickel, aluminum or a combination of such metals. Combinations of stainless steel and chromium having a total thickness of about 300–2000 Å are preferred.

Optionally, the reflective metal layer is covered with a clear protective layer to improve scratch resistance. The protective layer is thinner than the metal layer and is preferably an oxide of silicon or titanium applied at a thickness of about 50–500 Å. The protective oxide layer is sputtered over the metal layer in a vacuum chamber. Alternatively, the protective layer may be a topcoat of a UV-stable polymer such as an acrylic or a fluoropolymer, with a thickness of about 0.1–1 mil.

BRIEF DESCRIPTION OF THE DRAWINGS

FIG. 1 is a flow sheet diagram of the process of the present invention.

FIG. 2 is a perspective view of a piece of shaped vehicle trim made in accordance with the present invention.

FIG. 3 is a schematic fragmentary cross-sectional view of the reflective laminated strip of the present invention.

FIG. 4 is a perspective view of an alternative piece of shaped vehicle trim made in accordance with the invention.

DETAILED DESCRIPTION OF PREFERRED EMBODIMENTS

In a preferred embodiment of the invention, an aluminum alloy sheet is laminated with a metallized polymer sheet in a continuous coil process. The laminate is then cut and shaped into strips that are useful for trim on vehicles.

As shown in FIG. 1, a coil 10 of AA5182 alloy sheet 11 in the H2E84 temper having a width of about 48 inches (1.22 m) is unwound in a continuous process. The sheet 11 has a thickness of about 1/32 inch (0.8 mm).

The sheet is cleaned in an alkaline bath 13 to remove residual lubricants and other surface contaminants. The bath 13 is a dilute alkaline solution containing sodium carbonate dissolved in water.

The cleaned sheet is roll coated on both sides by rolls 15, 16 wetted by containers 17, 18 holding Betz Dearborn 1904 conversion coating solution. The conversion coated sheet includes an adherent film on both sides having a coating thickness of about 5–25 mg/ft$^2$, preferably about 10 mg/ft$^2$.

The conversion coated sheet is coated on its top side or first outer surface 20 with a roll 21 wetted by a container 22 of Morton M805 polypropylene. The polypropylene adhesive layer has a thickness of approximately 0.4 mil (10 microns).

A back side or second outer surface 25 is coated by a roll 26 wetted with a wash coating supplied by a container 27. The back side coating layer is preferably a PPG 1BHC5428 epoxy having a thickness of approximately 0.1 to 0.3 mil (3–8 microns).

The adhesive and epoxy coating layers are cured in an oven 30 heated to a temperature of about 350°–500° F. A satisfactory cure is achieved within about 60 seconds.

The sheet passes from the oven 30 into a set of rolls 32, 33 where a metallized polyester sheet 35 is pressed against the first outer surface 20. An interior side 36 of the sheet 35 faces the first outer surface 20 and an exterior side 37 is coated with a reflective metal layer. The interior side 36 is preferably coated with an adhesion-promoting metal or metal oxide layer, preferably a sputtered stainless steel layer having a thickness of about 50–150 Å. The adhesion-promoting metal layer improves adhesion between the polyester sheet 35 and the polypropylene coated outer surface 20 of the aluminum alloy sheet 11. A particularly preferred polyester sheet 35 has a thickness of about 1 mil (25 microns). The vacuum sputtered reflective metal layer is preferably a chromium layer having a thickness of about 1000 Å.

The laminated sheet or laminate 40 is rewound onto a coil 45. The laminate 40 is then transferred to a cutter 50 where it is cut into elongated strips each having a width of about 0.4–16 inches (1–40 cm). The strips are then shaped by a set of shaping dies 55. One example of a piece of shaped vehicle trim 60 made by the process of our invention is shown in FIG. 2.

As shown in FIG. 3, a vehicle trim strip 60 of the invention includes an aluminum alloy strip 61 covered by a conversion coating 62. A polypropylene adhesive layer 63 joins the aluminum strip 61 to a polyester layer 64 covered by a reflective chromium layer 65. A sputtered silica layer 66 overlies the chromium layer 65. An adhesion-promoting metal layer 67 covers an interior surface of the polyester layer 64. The adhesion-promoting layer is preferably a sputtered layer of stainless steel having a thickness of about 50–150Å.

An alternative vehicle trim strip 70 of the invention is shown in FIG. 4. The strip 70 includes an aluminum alloy substrate 72 having a reflective surface 74 and three surfaces 76, 77, 78 adhered to opaque strips 76a, 77a, 78a. The reflective surface 74 is adhered to a polyester layer 80 covered by a reflective chromium layer and an adhesion-promoting metal layer, all as described above. The opaque strips 76a, 77a, 78a are preferably made from a thermoplastic polymer such as polyvinyl chloride, chlorinated polyvinyl chloride, a polyolefin such as grafted polypropylene, silicone rubber, EPDM rubber, or a polysulfone. Polyvinyl chloride (PVC) is particularly preferred.

The strip 70 is manufactured by providing an aluminum alloy substrate 72 joined with the polyester layer 80 to an adhesive applicator. There, an adhesive layer is applied only to the three surfaces 76, 77, 78 that are to be covered by opaque strips. The adhesive coated strip is fed through an extruder where an opaque, pigmented PVC layer is coextruded onto the entire strip. The PVC layer is preferably scored with sharp knife blades at side edges of the reflective polyester layer 80. Although the entire substrate 72 is covered with PVC, the PVC is easily removed from areas such as the polyester layer 80 not covered by adhesive. The opaque strips 76a, 77a, 78a remain adhered to the substrate 72 over the three areas where adhesive was applied.

Having described the presently preferred embodiments, it is to be understood that the invention may be otherwise embodied within the scope of the appended claims.

What is claimed is:

1. A reflective laminated strip suitable for use as vehicle trim comprising:

(a) a strip comprising steel or an aluminum alloy of the AA3000, 5000, 6000 or 7000 series, said strip having a width of about 1–100 cm and a thickness of about 0.3–3.2 mm;

(b) a cleaned first outer surface on said metal strip;

(c) an adhesive layer adjacent said first outer surface; and (d) a polymer layer having a thickness of about 10–250 microns joined to said adhesive layer, said polymer layer comprising an interior side adjacent said adhesive layer and an exterior side coated with a reflective metal layer comprising chromium, steel, nickel, aluminum, or a combination thereof, and having a thickness of less than about 5000Å.

2. The reflective laminated strip of claim 1 wherein said adhesive layer comprises an epoxy adhesive or a polypropylene adhesive.

3. The reflective laminated strip of claim 1 wherein said polymer layer comprises a polyester, polyimide, polyolefin or polyvinyl chloride.

4. The reflective laminated strip of claim 1 wherein said reflective metal layer has a thickness of about 200–3000 Å.

5. The reflective laminated strip of claim 1 wherein said reflective metal layer is covered with a protective layer comprising a polymer or an oxide of silicon or titanium.

6. The reflective laminated strip of claim 5 wherein said protective layer comprises a UV-stable polymer topcoat having a thickness of about 0.1–1 mil.

7. The reflective laminated strip of claim 1 wherein said interior side is coated with an adhesion-promoting layer comprising a metal or a metal oxide.

8. The reflective laminated strip of claim 1 wherein said adhesion-promoting layer comprises a metal selected from the group consisting of chromium, steel, nickel, aluminum, and mixtures thereof.

9. The reflective laminated strip of claim 8 wherein said adhesion-promoting layer has a thickness of about 50–5000 Å.

10. The reflective laminated strip of claim 1 wherein said polymer layer has a thickness of about 25–100 microns.

11. A reflective laminated strip suitable for use as vehicle trim and comprising:

(a) a metal strip comprising steel or an aluminum alloy selected from the group consisting of the AA 3000, 5000, 6000, and 7000 series, said metal strip having a thickness of about 0.3–3.2 mm, said metal strip including an outer surface;

(b) a polymeric adhesive layer adjacent said outer surface;

(c) a polymer layer having a thickness of about 10–250 microns joined to said adhesive layer, said polymer layer comprising a polymer selected from the group consisting of polyesters, polyimides, polyolefins, and polyvinyl chloride, said polymer layer having:

(i) an exterior side coated with a reflective metal layer having a thickness of less than about 5000 Å and comprising a metal selected from the group consisting of steel, chromium, nickel, aluminum, and mixtures thereof, and (ii) an interior side coated with an adhesion-promoting metal layer or metal oxide layer having a thickness of about 50–5000 Å; and (d) optionally, a protective layer covering said metal layer and having a thickness of not more than about 1 mil.

12. A process for making a reflective laminated strip suitable for use as vehicle trim comprising:

(a) conversion coating at least one outer surface of a steel or aluminum alloy sheet to generate thereon an adherent film comprising a metal compound;

(b) applying to the conversion coated outer surface a polymeric adhesive layer;

(c) joining to said adhesive layer a polymer sheet having a thickness of about 10–250 microns and comprising an interior side adjacent said adhesive layer and an exterior side coated with a reflective metal layer comprising chromium, steel, nickel, aluminum, or a mixture thereof and having a thickness of less than about 5000 Å, thereby to form a metal-polymer laminate; and (d) cutting and shaping said laminate into at least one strip suitable for use as vehicle trim.

13. The process of claim 12 wherein said interior side of the polymer sheet is coated with an adhesion-promoting metal layer or metal oxide layer having a thickness of about 50–5000 Å.

14. The process of claim 13 wherein said adhesion-promoting metal layer or metal oxide layer has a thickness of about 100–1000 Å.

15. The process of claim 12 wherein said reflective metal layer has a thickness of about 200–3000 Å.

16. The process of claim 12 further comprising:

(e) before step (a), cleaning said outer surface to remove contaminants therefrom and to leave a cleaned surface.

17. The process of claim 12 further comprising:

(f) covering said reflective metal layer with a protective layer comprising a polymer or an oxide of silicon or titanium.

18. A process for making a coextruded laminated strip having a reflective outer surface and at least one opaque outer surface comprising:

(a) conversion coating at least one outer surface of an aluminum alloy sheet to generate thereon an adherent film comprising a metal compound;

(b) applying a polymeric adhesive layer to a portion of the conversion coated outer surface;

(c) joining to said adhesive layer a polymer sheet having a thickness of about 10–250 microns and comprising an interior side adjacent said adhesive layer and an exterior side coated with a reflective metal layer having a thickness of less than about 5000 Å, thereby to form a metal-polymer laminate;

(d) cutting and shaping said laminate into at least one strip;

(e) applying an adhesive to at least one surface of said strip not covered by said polymer sheet;

(f) coextruding said strip with a layer of pigmented polymer, said pigmented polymer layer adhering to said adhesive; and (g) removing said pigmented polymer layer from said polymer sheet.

19. The process of claim 18 wherein said interior side of the polymer sheet is coated with an adhesion-promoting metal layer or metal oxide layer having a thickness of about 50–5000 Å.

* * * * *

UNITED STATES PATENT AND TRADEMARK OFFICE
CERTIFICATE OF CORRECTION

PATENT NO. : 6,077,616
DATED : June 20, 2000
INVENTOR(S) : Daniel L. Serafin et al It is certified that error appears in the above-identified patent and that said Letters Patent is hereby corrected as shown below:

Col. 5, line 31                  After claim, delete "1" and insert --7--.
Claim 8

Signed and Sealed this

Twenty-ninth Day of May, 2001

Attest:

NICHOLAS P. GODICI

*Attesting Officer*        *Acting Director of the United States Patent and Trademark Office*